May 11, 1937. R. STRINDBERG 2,080,154
AIR FILTER
Filed Dec. 10, 1932 3 Sheets-Sheet 1

INVENTOR
Richard Strindberg
BY
ATTORNEY

May 11, 1937.    R. STRINDBERG    2,080,154
AIR FILTER
Filed Dec. 10, 1932    3 Sheets-Sheet 2

INVENTOR
Richard Strindberg
BY
ATTORNEY

May 11, 1937. R. STRINDBERG 2,080,154
AIR FILTER
Filed Dec. 10, 1932 3 Sheets-Sheet 3

INVENTOR
Richard Strindberg
BY
ATTORNEY

Patented May 11, 1937

2,080,154

UNITED STATES PATENT OFFICE 2,080,154

AIR FILTER

Richard Strindberg, Worcester, Mass., assignor to Development Associates, Inc., Worcester, Mass., a corporation of Massachusetts Application December 10, 1932, Serial No. 646,583

4 Claims. (Cl. 183—71)

This invention relates to that type of air or gas filter which employs a more or less porous fabric for the interception of dust and other foreign particles carried by air or gas which is forced through said fabric, the latter being arranged in glove or zig zag form to increase the effective filtering area and to diminish correspondingly the resistance to the passage of the air or gas through said material.

In prior devices of this character each filter unit is made up of a multiplicity of filter members which cooperate to hold the filtering material in position and to form an air-tight seal around the outer edge of the filter glove. One of the principal objects of the present invention is to provide a supporting structure which will retain the glove in its most efficient sealing filtering configuration and at the same time will consist of a relatively few parts, thereby making the filter unit inexpensive in construction.

A further object of the invention resides in the provision of a unit filter construction which is adapted to form one of several corresponding units in a large filter installation without the necessity for the interposition of any auxiliary frame or supporting structure for the units. To this end the outer casing for the unit is of a suitable size and configuration to enable it to be placed in direct contact with a similar unit and avoid the leakage of air between said units.

In prior devices of the character of the present invention the supporting structure for the filter material is necessarily so arranged that the air flow is substantially impeded by the several parts of the supporting structure. A further object of the present invention is to eliminate to as great an extent as possible any supporting structure which could interfere with the passage of air through the filter material, thereby increasing to a substantial extent the capacity of the filter unit. Moreover, the supporting parts of the unit which of necessity must be located in the air stream are so arranged as to interfere with the passage of air to the least possible extent.

Other and further objects and advantages of the invention will appear from the following detailed description taken in connection with the accompanying drawings in which a preferred embodiment of the invention is disclosed in the drawings.

The same numerals identify the same parts throughout.

Figure 2:
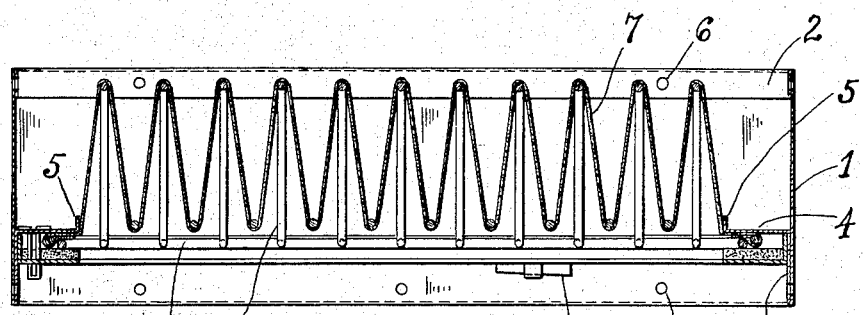
Figure 2 is a section of Figure 1 on line 2—2.
Figures 3, 4:
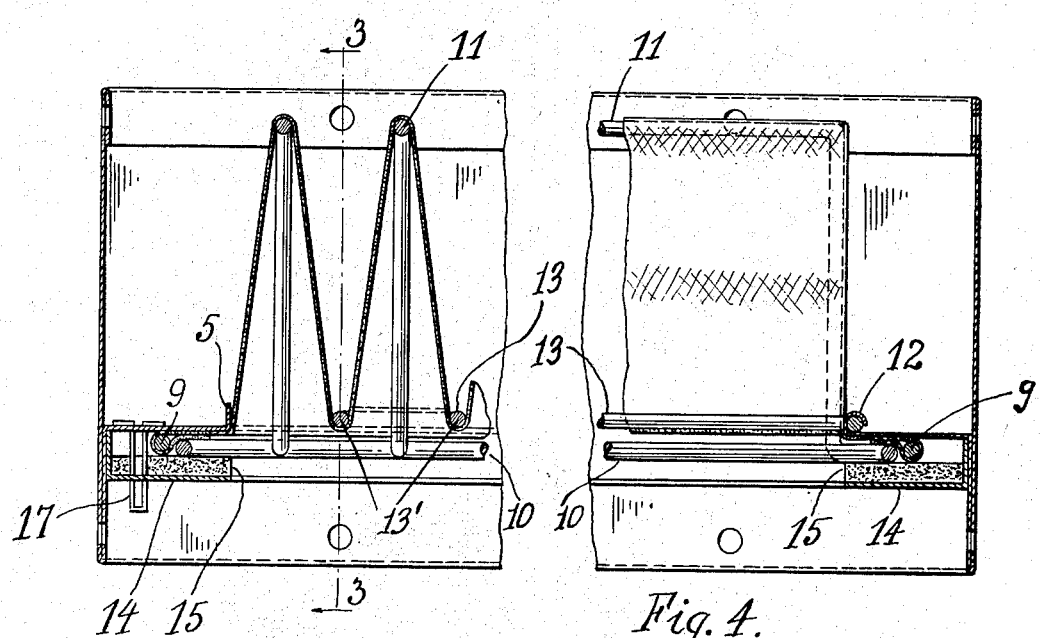
Figure 3 is an enlargement of part of Figure 2.
Figure 4 is a section of Figure 3 on line 3—3.
Figure 7:
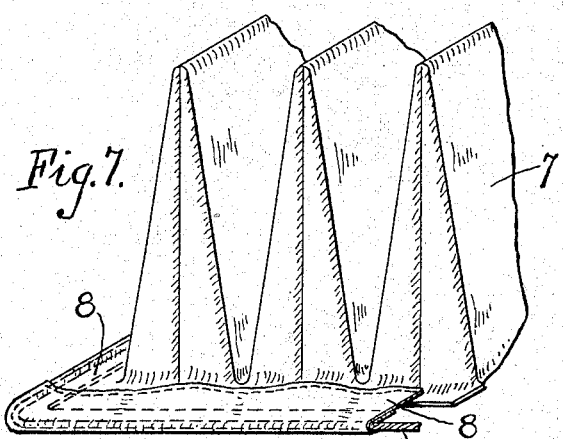
Figure 7 is the filter medium.
Figure 13:
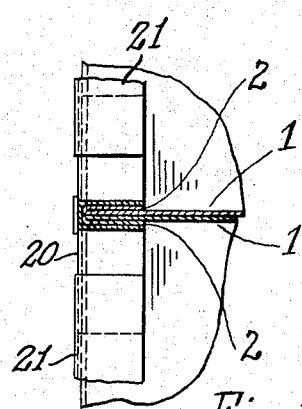
Figure 13 is an enlarged section of Figure 12 on line 7—7.
Figure 12:
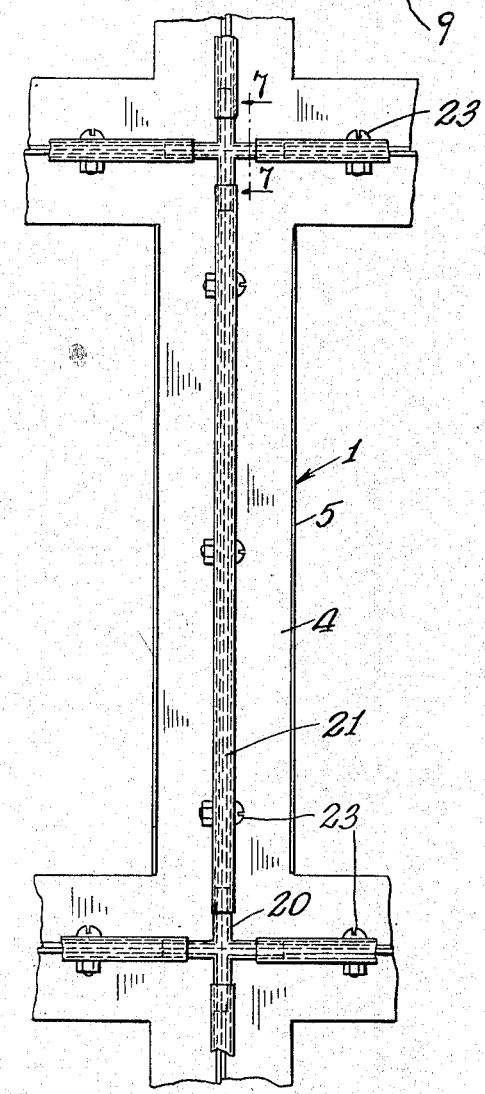
Figure 12 shows sealing members attached to a filter installation.

In the description of the drawings and particularly with reference to Figure 2, the outside casing of the filter consists of a sheet metal box or casing 1 which has the upper edge 2 bent over and flattened down in order to provide a smooth edge and increase strength. At the lower end of the box, the edge 3 is also bent over for the same purpose and the extension 4 forming an internal inwardly extending flange, is used as a support for the various parts comprising the filter unit. The flange 5 which extends perpendicularly to flange 4 at the latter's inner edge provides a smooth corner where the ends of the pocket shaped filter medium 7 are held against flange 4. At the upper and lower folded over edges the box or casing 1 is provided with holes 6 on all four sides so that a multiplicity of casings can be bolted together and thereby form large filter installations as shown in Figs. 12 and 13. Referring to Figures 3, 4, and 7 the multi-pocket or zig zag shaped filter medium or glove 7 is provided with a flat skirt or flange 8 on all four sides. The outer edge of the skirt 8 is folded double to form a hem into which is inserted a cord 9. The cord prevents the skirt of the filter medium from being pulled out of proper position in case of shrinking due to moisture in the air. A wire frame or distender 10 will hold the skirt of the filter medium securely when the filter is assembled.

Figure 1:
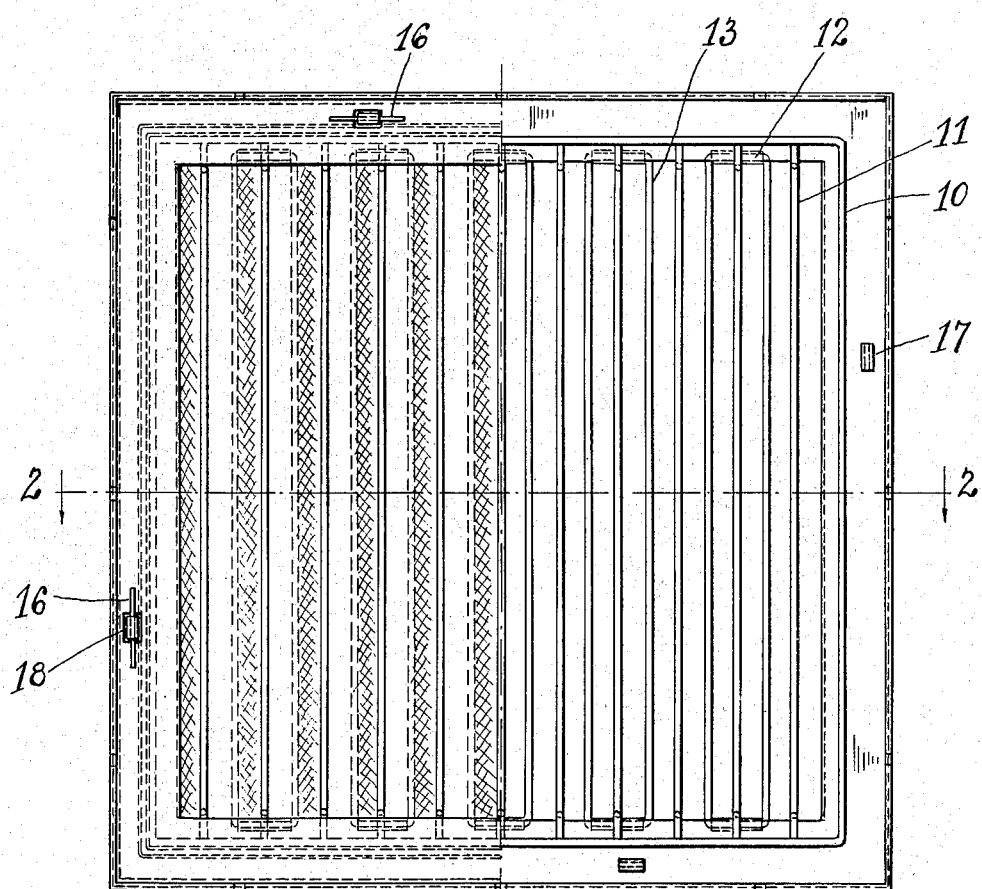
Figure 1 is a rear view of the filter, partly in section and with part of the filter medium removed.
Figure 6:
Figure 6 is a section of Figure 5 on line 6—6.
Figure 5:
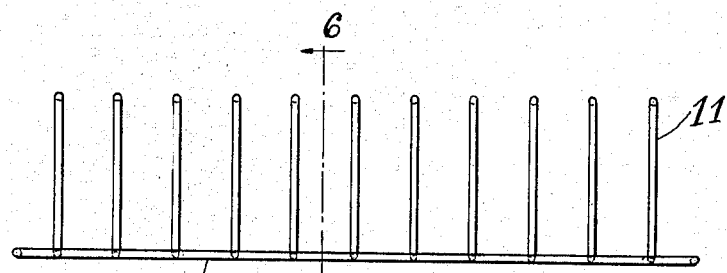
Figure 5 is an end view of the wire frame which supports the filter pockets on the inside.

Referring to Figures 1, 5, and 6, the wire frame or distender 10 which supports the filter medium comprises a heavy wire 10' in the form of a square, to the opposite edges of which are secured the ends of the wires 11, the latter each being substantially U-shaped for supporting each of the filter pockets separately at the top only.

As shown in Figures 1 and 4, the flange 5 is notched out in several places on opposite sides to form tongues 12 which are bent over to hold the wire 13 which has been bent into zig zag shape to form parallel bars 13' spaced apart a distance equal to the spacing of the wires 11. When the pocket shaped filter medium is inserted in the casing the wires 11 support the top of the pockets, whereas the bars 13' support the bottom of the pockets on the opposite side of the filter glove. By the arrangement described it is evident that every part of the pockets will be properly supported and stretched and the least possible obstruction of the air flow will result. The wire frame 10 is held tightly against the flange of the filter medium inside of the cord 9 by means of the rectangular inner frame 14 which on the inside is provided with a felt strip 15 to provide an airtight seal. The frame 14 is held in place by four wedges 16 which are inserted in the U-shaped members 17 secured as by spot welding to flange 4 and extending through slots 18 in the rectangular frame 14.

Figure 10:
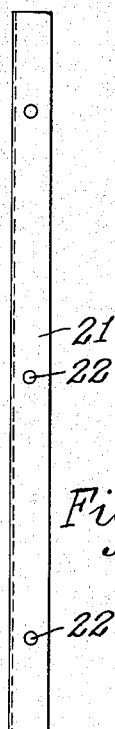
Figure 10 is a side view of a sealing member for the sides of adjacent filter units.
Figure 11:
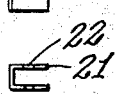
Figure 11 is an end view of Figure 10.
Figure 8:
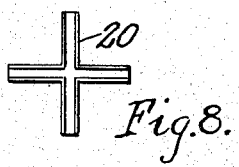
Figure 8 is a top view of the sealing member at intersection of adjacent filter units.
Figure 9:
Figure 9 is a side view of Figure 8.

Whenever a number of filter units are bolted together to form a large air filter installation, certain air leaks will be found along the edges of the outer casings, regardless of the number of bolts used, these leaks occurring particularly at the intersections formed by the corners of the casings of four adjacent filter units. No matter how sharp the inside corner bend is made in forming the casing, the outer corner will usually have a slight radius which will form an opening where the corners of four adjacent filter units meet. Although this opening is in general immaterial, there are certain filter installations where the very slight amount of dust leaking through is objectionable. In order to obtain perfect tightening, the corner seal 20 shown in Figs. 8 and 9 is placed over the edges of the filter casings at the corners thereof, said seal embracing all four casings. As shown in the drawings, each seal 20 is in the form of a cross, with each arm of the cross U-shaped in cross section. The seals 20 are held in place by the U-shaped seals 21 (shown in Figs. 10 and 11), which extend over contiguous edges of adjoining casings and at each end overlap the corner seals. The U-shaped seals are provided with holes 22 which line up with the holes 6 along the edges of the casings. By inserting bolts 23 the filter units are joined together securely and perfect air seals are also provided without the use of any packing or other filling between the casings as provided for such purposes in other designs of unit filter installations.

In accordance with the above construction, it will be clear that a new and improved filter has been devised in which the filter material is held distended at an angle to the air movement thereby obtaining the maximum benefit of the filter cloth and permitting the cleaning of the material when desired, with a vacuum cleaner having a suitably shaped nozzle.

Where the material of the sides of the pockets is substantially parallel, there is a tendency to choke the filter and thereby reduce its capacity and at the same time make it difficult to clean it. This objection is avoided by supporting the filter material in the form of tapered pockets with the opposite sides of the pocket converging in the direction of the movement of air through the filter glove.

In order that a filter installation may be built up the inner frame is so arranged as to be removable without the necessity for the removal of the outer casing 1 from the filter installation, and it will be apparent that the filter glove of any unit can be removed from a filter installation for replacement without affecting the complete installation. Moreover, it will be seen that because of the assemblage of the device with the two frames, the filter glove may be readily removed and replaced whenever desired, since the frames 14, the distenders 10 and the filter gloves 7 are interchangeable.

The assemblage, moreover, insures that there should be a tight fit between adjacent units at all times and when desired a complete unit may be removed for replacement with a minimum of labor. Obviously the replacement is necessary only in the event of damage to the casing or the bars 13' attached thereto, which would prevent said casing from supporting the filter glove properly. It will also be noted that the arrangement of parts is such that the filter glove may be cleaned without removal of the glove from the casing, or removal of the filter unit from a complete installation. This cleaning "in place" of the glove is possible since both sides of the glove are substantially free from obstruction. Because of the angularity of the filter material and the large area exposed, a much greater capacity of filter is obtained and because of the manner in which the filter unit is held within the casing, its replacement is facilitated and the tightness of the joint is maintained.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:—

1. A filter comprising a rectangular casing having an internal flange extending inwardly therefrom, a filter glove having a plurality of tapering fingers, a frame adapted to fit within said casing against said flange, a plurality of parallel bars carried by said flange and a distender having a plurality of elements adapted to extend within the pockets of the filter glove for holding said pockets in distended position, said distender and the parallel bars cooperating in holding said glove in filtering condition, said glove having a peripheral skirt adapted to be positioned between the flange and the frame for forming an air seal at the sides thereof.

2. A filter comprising a rectangular casing having an internal flange extending inwardly therefrom, a filter glove having a plurality of tapering fingers, a frame adapted to fit within said casing against said flange, a plurality of parallel bars carried by said flange and a distender having a plurality of elements adapted to extend within the pockets of the filter glove for holding said pockets in distended position, said distender and the parallel bars cooperating in holding said glove in filtering condition, said glove having a peripheral skirt adapted to be positioned between the flange and the frame for forming an air seal at the sides thereof, and means for holding said frame against the flange with the skirt therebetween.

3. A filter unit comprising a rectangular casing having a plurality of parallelly arranged supporting bars therein, a filter glove, a distender frame having a plurality of supporting members cooperating with the bars for holding the glove in distended position, and a clamping member for holding said distender frame in position in the casing, said clamping member cooperating with the edge of the filter glove to form an air seal at the edge thereof.

4. In a filter unit, a casing having an internal flange supporting a plurality of parallelly arranged supporting bars, a filter glove, a distender unit cooperating with said bars for supporting the filter glove in distended position, and a frame cooperating with said flange for holding said distender unit in proper position, said frame also providing in conjunction with the edge of the filter curtain an air seal at the edge of said curtain.

RICHARD STRINDBERG.